United States Patent
Van Limpt et al.

(10) Patent No.: US 12,522,531 B2
(45) Date of Patent: Jan. 13, 2026

(54) GLASS BATCH COMPOSITIONS COMPRISING CULLET AND METHODS OF FORMING GLASS WITH CULLET

(71) Applicant: Sibelco Nederland N.V., Maastricht (NL)

(72) Inventors: Johannes Van Limpt, Reusel (NL); Lesley Beyers, Leuven (BE)

(73) Assignee: SIBELCO NEDERLAND N.V., Maastricht (NL)

( * ) Notice: Subject to any disclaimer, the term of this patent is extended or adjusted under 35 U.S.C. 154(b) by 650 days.

(21) Appl. No.: 17/850,716

(22) Filed: Jun. 27, 2022

(65) Prior Publication Data

US 2022/0411315 A1    Dec. 29, 2022

(51) Int. Cl.
*C03C 1/00* (2006.01)
*C03B 1/00* (2006.01)
*C03C 3/087* (2006.01)

(52) U.S. Cl.
CPC ............. *C03C 1/002* (2013.01); *C03B 1/00* (2013.01); *C03C 3/087* (2013.01); *C03C 2203/10* (2013.01)

(58) Field of Classification Search
CPC ................................ C03C 1/002; C03C 3/087
See application file for complete search history.

(56) References Cited

U.S. PATENT DOCUMENTS

2017/0368584 A1*  12/2017  Demott ................. C03B 5/44
2022/0194842 A1*   6/2022  Lee ....................... B09B 3/50

FOREIGN PATENT DOCUMENTS

WO    WO 99/52831        10/1999
WO    WO 2006/053336 A2   5/2006

OTHER PUBLICATIONS

Partial European Search Report and Search Opinion issued for EP Application No. 21182027.9 on Mar. 10, 2022.
Extended European Search Report issued for EP Application No. 21182027.9 on May 18, 2022.
Kahl et al., "High cullet levels in container glass: observations, challenges, solutions," https://www.yumpu.com/en/document/read/21546329/high-cullet-levels-in-container-glass-glasstrend, Oct. 9, 2012.

* cited by examiner

*Primary Examiner* — Elizabeth A. Bolden
(74) *Attorney, Agent, or Firm* — Klarquist Sparkman, LLP

(57) ABSTRACT

The present disclosure relates to glass batch compositions. The present disclosure also relates to methods of forming glass with cullet.

16 Claims, 1 Drawing Sheet

GLASS BATCH COMPOSITIONS COMPRISING CULLET AND METHODS OF FORMING GLASS WITH CULLET

CROSS REFERENCE TO RELATED APPLICATION

This application claims the benefit of and priority to the earlier filing date of European Application No. EP21182027.9, filed on Jun. 28, 2021, which is incorporated herein by reference in its entirety.

FIELD

The present disclosure relates to glass batch compositions. The present disclosure also relates to methods of forming glass with cullet.

BACKGROUND

When waste glass is recycled, the glass is often broken and/or ground into a plurality of different pieces of waste glass. The plurality of pieces of waste glass is not always pure glass and often includes contaminants, for example organic material, metals and ceramic pieces. A plurality of pieces of waste glass is often referred to as cullet.

Organic material mixed amongst waste glass is an inherent part of municipal glass waste streams. For container glass, organic material can originate from paper, glue, sugar, oil, fat, plastic, wood and/or cork. Cullet including organic contamination is generally not used in forming new glass. Often organic contamination is removed by washing cullet, burning off organic contamination and/or slow natural decomposition by fermentation, prior to introducing cullet into a glass batch for forming new glass.

Raw cullet, formed from breaking and/or grounding waste glass, is often separated into different streams of cullet, the different streams having different characteristics. US 2012/0006130 A1 discloses a method for grading the quality of cullet. This document acknowledges that cullet pieces smaller than about ¼" (0.25 inches; 0.635 cm) are considered susceptible to carry a large proportion of "invisible organics" due to the high surface area to volume ratio. US 2012/0006130 A1 views organics present in cullet as undesirable contaminants.

While the size of particles in a cullet stream is dependent on the operating procedure of a glass recycling plant and the quality specification of the customer, four typical cullet streams can be defined by the following size ranges (defined with reference to the maximum dimension of the cullet particles in each stream):

1. Finest: Less than 0.5 mm
2. Finer: From 0.5 mm to less than 2 mm
3. Fine: From 2 mm to 5 mm
4. Coarse: Greater than 5 mm In each of these streams, there may be some particles falling outside of the recited ranges. For example, in the fine and coarse streams, there may be 5 weight % or less particles falling within the finest and the fine streams, by size.

Cullet with particle sizes greater than 5 mm (i.e. the coarse stream), can be sorted with high accuracy and is generally accepted for glassmaking. The fine stream (from 2 mm to 5 mm) can still be accepted for glassmaking, as a minor fraction, if contamination criteria are met. Typically, glass manufacturers will not accept cullet falling within the fine stream (from 2 mm to 5 mm) if it includes high levels of organic contamination.

Often, the fine, finer and the finest streams of cullet are sent to landfill. The fine, finer and the finest streams of cullet are viewed by glassmakers as impure, at least due to their higher levels of organic contamination. The finest, finer and/or fine streams can sometimes be combined and sent to landfill as waste.

There is a need for a new use of cullet streams, wherein the cullet streams include levels of organic contamination leading to rejection by glass manufacturers.

SUMMARY

The present disclosure concerns glass batch compositions comprising fine, finer and/or finest cullet.

The present disclosure also relates to a method of forming glass, where the glass batch for forming the glass comprises fine, finer and/or finest cullet.

Embodiments of the present disclosure are as set out in the following clauses:

1. A glass batch composition comprising (or consisting of):
   from 1 weight % to 50 weight % a first plurality of glass cullet particles, wherein the first plurality of glass cullet particles have a maximum dimension of 5 mm or less and the glass cullet particles are organically contaminated;
   from 50 weight % to 99 weight % other components of the glass batch; and
   unavoidable impurities;
   wherein the organic contamination of the first plurality of glass cullet particles:
   a. measured by loss on ignition ("LOI") is from 0.5 weight % to 20 weight % of the first plurality of glass cullet particles; and/or,
   b. measured by chemical oxygen demand ("COD") is from 4,000 mg $O_2$/L to 75,000 mg $O_2$/L; and/or,
   c. measured by combustion analysis provides a carbon content of from 0.30 weight % to 15 weight %.

2. The glass batch composition according to clause 1, wherein the organic contamination of the first plurality of glass cullet particles:
   a. measured by loss on ignition ("LOI") is from 0.5 weight % to 20 weight % of the first plurality of glass cullet particles; and
   b. measured by chemical oxygen demand ("COD") is from 4,000 mg $O_2$/L to 75,000 mg $O_2$/L; and
   c. measured by combustion analysis provides a carbon content of from 0.30 weight % to 15 weight %.

3. The glass batch composition according to clause 1 or clause 2, wherein the organic contamination of the first plurality of glass cullet particles measured by loss on ignition ("LOI") is: from 1.2 weight % to 20 weight % of the first plurality of glass cullet particles; or, from 2.5 weight % to 17.0 weight % of the first plurality of glass cullet particles.

4. The glass batch composition according to any one of clauses 1 to 3, wherein the organic contamination of the first plurality of glass cullet particles measured by chemical oxygen demand ("COD") is: from 16,000 mg $O_2$/L to 75,000 mg $O_2$/L; or, from 15,000 mg $O_2$/L to 63,000 mg $O_2$/L.

5. The glass batch composition according to any one of clauses 1 to 4, wherein the organic contamination of the first plurality of glass cullet particles measured by combustion analysis provides: a carbon content of from 0.45 weight % to 11 weight %; or, a carbon content of from 1.5 weight % to 10 weight %.

6. The glass batch composition according to any one of clauses 1 to 5, wherein the first plurality of glass cullet particles have a maximum dimension of: 2 mm or less; 1.5 mm or less; or, 1 mm or less.

7. The glass batch composition according to any one of clauses 1 to 6, wherein the first plurality of glass cullet particles have a maximum dimension of: from 5 μm to 500 μm; or, from 5 μm to 300 μm.

8. The glass batch composition according to any one of clauses 1 to 7, wherein the glass batch composition comprises from 1 weight % to 50 weight % (or from 1 weight % to 25 weight %) a first plurality of glass cullet particles, wherein the glass cullet particles have a maximum dimension of 2 mm or less and the glass cullet particles are organically contaminated.

9. The glass batch composition according to any one of clauses 1 to 8, wherein the other components comprise a second plurality of glass cullet particles (optionally having a maximum dimension of greater than 5 mm), wherein the second plurality of glass cullet particles all have a maximum dimension greater than the first plurality of glass cullet particles.

10. The glass batch composition according to any one of clauses 1 to 9, wherein the first plurality of glass cullet particles, and optionally the second plurality of glass cullet particles, are organically contaminated with one, two, three, four, five, six or seven of: cellulose, lignin, proteins, lipids, carbohydrates, polymers and/or plastics.

11. The glass batch composition according to any one of clauses 1 to 10, wherein the first plurality of glass cullet particles, and optionally the second plurality of glass cullet particles, are organically contaminated with one, two, three, four, five, six, seven or eight of: paper, glue, sugar, oil, fat, plastics, wood and/or cork.

12. The glass batch composition according to any one of clauses 1 to 11, wherein the glass batch composition is a loose glass batch composition; optionally, wherein the loose glass batch is not agglomerated in pellet or briquette form.

13. The glass batch composition according to any one of clauses 1 to 12, wherein the first plurality of glass cullet particles, and optionally the second plurality of glass cullet particles, is free of metals and/or ceramics.

14. The glass batch composition according to any one of clauses 1 to 13, wherein the glass batch composition is a soda lime glass batch composition.

15. The glass batch composition of clause 14, wherein the from 50 weight % to 99 weight % other components of the glass batch composition comprise, or consist of:
silica sand, soda ash and limestone.

16. The glass batch composition of any one of clauses 1 to 15, wherein the glass batch composition is a flint glass batch composition; optionally, comprising silica sand, soda ash, limestone and dolomite; optionally, further comprising sodium sulfate.

17. The glass batch composition of any one of clauses 1 to 16, wherein the:
from 1 weight % to 50 weight % a first plurality of glass cullet particles component of the glass batch composition provides a contributing redox factor of from 0 to −1.5 to the glass batch composition.

18. The glass batch composition of any one of clauses 1 to 17, wherein the glass batch composition has a batch redox number of: from −40 to +20; or, from −20 to +20.

19. The glass batch composition of any one of clauses 1 to 18, wherein the first plurality of cullet particles, and/or the second plurality of cullet particles, absent organic contamination (the glass fraction) have a chemical composition comprising:

| Compound | Weight % |
| --- | --- |
| $Fe_2O_3$ | From 0.3 to 0.8 |
| $Al_2O_3$ | From 1.5 to 2.2 |
| $K_2O$ | <1 |
| CaO | From 11 to 12 |
| MgO | From 1.3 to 1.6 |
| $Na_2O$ | From 12 to 13 |
| $SiO_2$ | From 70.31 to 73.84 |
| $Cr_2O_3$ | From 0.06 to 0.09 |

20. A method of forming glass, the method comprising:
introducing the glass batch composition of any one of clauses 1 to 19 into a glass furnace;
heating the glass batch composition to produce a glass solution; and
cooling the glass solution to make a glass.

21. Use of a plurality of glass cullet particles, wherein the glass cullet particles have a maximum dimension of 5 mm or less and the glass cullet particles are organically contaminated, to control the redox number of a glass batch composition.

22. The use of clause 21, wherein the glass cullet particles have a maximum dimension of 2 mm or less.

23. The use of clause 21, wherein the glass cullet particles have a maximum dimension of 1 mm or less.

24. The use of any one of clauses 21 to 23, wherein the glass cullet particles contribute a redox factor of from 0 to −1.5 to the glass batch composition.

25. The use of any one of clauses 21 to 24, wherein the glass batch composition has a batch redox number of: from −40 to +20; or, from −20 to +20.

26. The use of any one of clauses 21 to 25, wherein the glass batch composition is according to any one of clauses 1 to 19.

Alternatively, aspects of the present disclosure relate to the following clauses:

1B. A glass batch composition comprising:
from 1 weight % to 50 weight % a first plurality of glass cullet particles, wherein the glass cullet particles have a maximum dimension of 2 mm or less and the glass cullet particles are organically contaminated; and
from 50 weight % to 99 weight % other components of the glass batch.

2B. The glass batch composition of clause 1B, wherein the first plurality of glass cullet particles have a maximum dimension of 1 mm or less (or 1.5 mm or less).

3B. The glass batch composition according to clause 1B or clause 2B, wherein the first plurality of glass cullet particles have a maximum dimension of from 5 μm to 300 μm.

4B. The glass batch composition of any one of clauses 1B to 3B, wherein the glass batch composition comprises from 1 weight % to 35 weight % (or from 1 weight % to 25 weight %) a first plurality of glass cullet particles, wherein the first plurality of glass cullet particles have a maximum dimension of 2 mm or less and the first plurality of glass cullet particles are organically contaminated.

5B. The glass batch composition according to any one of clauses 1B to 4B, wherein the other components of the glass batch comprise a second plurality of glass cullet particles wherein the second plurality of glass cullet particles all have a maximum dimension greater than the first plurality of glass cullet particles.

6B. The glass batch composition according to any one of clauses 1B to 5B, wherein the first plurality of glass cullet particles, and optionally the second plurality of glass cullet particles, are organically contaminated with one, two, three, four, five or six of: cellulose, lignin, proteins, lipids, carbohydrates and/or plastics.

7B. The glass batch composition according to any one of clauses 1B to 6B, wherein the first plurality of glass cullet particles, and optionally the second plurality of glass cullet particles, are organically contaminated with one, two, three, four, five, six, seven or eight of: paper, glue, sugar, oil, fat, plastic, wood and/or cork.

8B. The glass batch composition according to any one of clauses 1B to 7B, wherein the glass batch composition is a loose glass batch composition; optionally, wherein the loose glass batch is not agglomerated in pellet or briquette form.

9B. The glass batch composition according to any one of clauses 1B to 8B, wherein the organic contamination of the first plurality of glass cullet particles measured by loss on ignition ("LOI") is from 0.5 weight % to 20 weight %.

10B. The glass batch composition according to any one of clauses 1B to 9B, wherein the glass batch composition comprises:
from 1.5 weight % to 25 weight % a first plurality of glass cullet particles, and, wherein the organic contamination of the first plurality of glass cullet particles measured by loss on ignition ("LOI") is from 2.5 weight % to 17 weight %; or,
from 5.0 weight % to 15 weight % a first plurality of glass cullet particles, and, wherein the organic contamination of the first plurality of glass cullet particles measured by loss on ignition ("LOI") is from 2.5 weight % to 6 weight %.

11B. The glass batch composition according to any one of clauses 1B to 10B, wherein the first plurality of glass cullet particles is free of metals and/or ceramics; and, optionally, wherein the second plurality of glass cullet particles is free of metals and/or ceramics.

12B. The glass batch composition according to any one of clauses 1B to 11B, wherein the glass batch composition is a soda lime glass batch composition.

13B. The glass batch composition of clause 12B, wherein the from 50 weight % to 99 weight % other components of the glass batch composition comprise, or consist of: silica sand, soda ash and limestone.

14B. The glass batch composition of clause 13B, wherein the other components of the glass batch further comprise cullet particles coarser than the first plurality of glass cullet particles.

15B. The glass batch composition of any one of clauses 1B to 14B, wherein the first plurality of glass cullet particles component of the glass batch composition provides a contributing redox factor of from 0 to −1.5 to the glass batch composition.

16B. The glass batch composition of any one of clauses 1B to 15B, wherein the glass batch composition has a batch redox number of from −40 to +20.

17B. The glass batch composition of any one of clauses 1B to 16B, wherein the organic contamination of the first plurality of glass cullet particles:
a. measured by loss on ignition ("LOI") is from 0.5 weight % to 20 weight % of the plurality of glass cullet particles; and/or,
b. measured by chemical oxygen demand ("COD") is from 4,000 mg $O_2$/L to 75,000 mg $O_2$/L; and/or,
c. measured by combustion analysis provides a carbon content of from 0.30 weight % to 15 weight %.

1M. A method of forming glass, the method comprising:
introducing the glass batch composition of any one of clauses 1B to 17B into a glass furnace;
heating the glass batch composition to produce a glass solution; and
cooling the glass solution to make a glass.

1BM. A method of forming glass, the method comprising:
introducing a plurality of glass cullet particles into a glass melt furnace, wherein the glass cullet particles have a maximum dimension of 2 mm or less (or 1 mm or less) and the glass cullet particles are organically contaminated;
introducing other components of a glass batch;
heating the plurality of glass cullet particles, and the other components of the glass batch, to produce a glass solution; and
cooling the glass solution to make a glass.

2BM. The method of clause 1BM, wherein the organic contamination measured by loss on ignition ("LOI") is from 0.5 weight % to 20 weight %.

BRIEF DESCRIPTION OF THE FIGURES

Embodiments of the disclosure are described below with reference to the accompanying drawings. The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
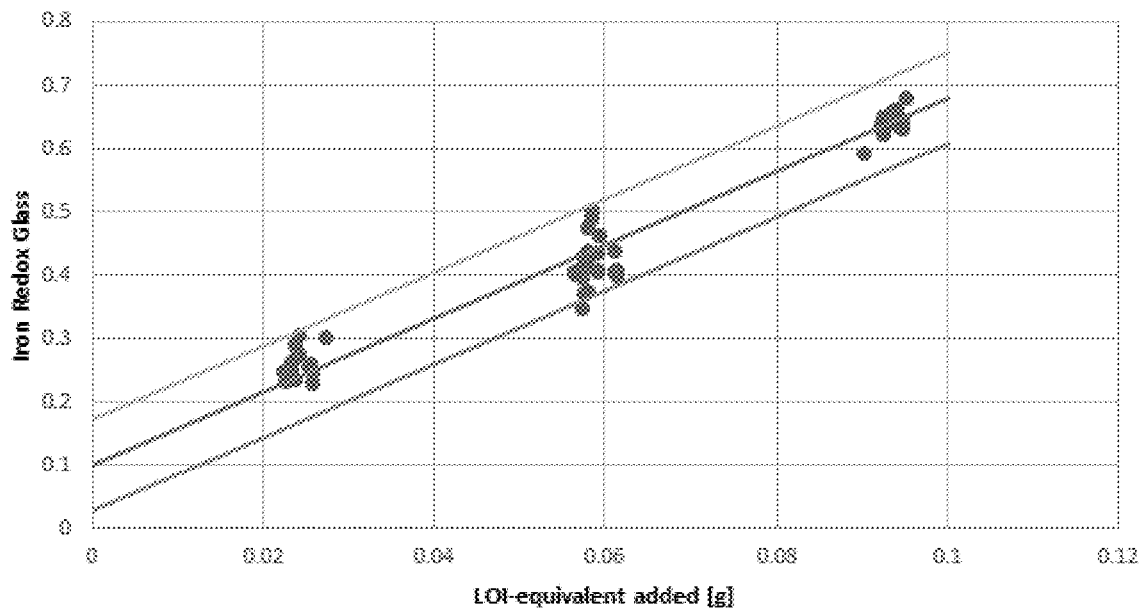
FIG. 1 shows the formation of green glass with targeted iron redox.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown.

Embodiments of the claims may, however, be embodied in many different forms and should not be construed as limited to the embodiments set forth herein. The examples set forth herein are non-limiting examples and are merely examples among other possible examples.

Some of the terms used to describe aspects of the present disclosure are set out below:

"Carbon content" refers to the total amount of carbon present in a sample. Carbon content can be measured by combustion analysis. In some examples, the carbon content can be measured by combustion analysis with a LECO™ CS230.

"Chemical oxygen demand" or "COD" refers to a measure of the amount of oxygen that can be consumed by reactions in a measured solution. COD is expressed in mass of oxygen consumed over volume of solution. A measure of COD quantifies the amount of organic material present in water. In some examples, the chemical oxygen demand can be measured according to a COD procedure using a HACH™ LCK 514.

"Cullet" refers to broken and/or ground waste glass. Cullet can be separated into different waste streams, depending on particle size and/or contamination. Cullet can be contaminated with organic material, metals and/or ceramic pieces.

"Cullet fines" refers to cullet in which the cullet particles have a maximum dimension of 5 mm or less. Cullet fines can be separated into different streams in which the cullet particles have the following maximum dimensions:
1. Finest cullet fines: Less than 0.5 mm
2. Finer cullet fines: From 0.5 mm to less than 2 mm
3. Fine cullet fines: From 2 mm to 5 mm.

"Glass" is an amorphous, non-crystalline, solid material. Glasses are typically brittle and often optically transparent. A glass is defined as an inorganic product of fusion which has been cooled through its glass transition to the solid state without crystallising. The main component of most glasses, in general use, is silica ($SiO_2$). Common glass is generally produced in a two step process, and then shaped to make it suitable for a variety of applications. The first step is batch mixing. The mixture of ingredients to make up the glass (typically at least, silica, sodium carbonate, calcium carbonate and recycled glass (in the form of cullet), together with small quantities of various other trace ingredients) are mixed, to ensure an even mix of ingredients, and fed into the furnace. In the second step, the mixture is heated to around 1,500° C., where the ingredients melt, various chemical reactions take place and $CO_2$ and $SO_2$ are evolved. These chemical reactions form molten glass (or, "glass solution") which can be moulded and cooled.

"Glass batch" or "Glass batch composition" refers to a mixture of ingredients intended to form a glass melt. A glass batch for forming a soda lime glass comprises silica sand, soda ash and limestone (along with other, optional, components). These components of a glass batch can be combined from separate raw materials or can be supplied pre-mixed.

"LOI" refers to loss on ignition. This measurement is obtained by strongly heating a sample (optionally a dried sample) at a specified temperature and allowing any volatile substances to escape. This continues until the mass of the sample stops changing. The value of LOI represents the mass of volatile material present in a sample. In some examples, the LOI can be measured from the decrease in mass after heat treatment in an oven.

"Maximum dimension" refers to the longest cross-sectional dimension of any particular particle.

"Redox number" refers in glass technology to a measure of the oxidation/reduction potential of glass batch components. One technique for quantifying the redox number of glass batch components is described in Simpson and Myers, "The Redox Number Concept and Its Use by the Glass Technologist," Glass Technology, Vol. 19, No. 4, Aug. 4, 1978, pages 82-85 (the disclosure of which is incorporated herein by reference). A glass batch (as a whole) has a "batch redox number". In general, a glass batch having a batch redox number of zero and above is considered "oxidized," and a glass batch having a negative batch redox number is considered "reduced."

"Redox factor" refers in glass technology to the amount one specific component of a glass batch contributes to the overall redox number of a glass batch, i.e. it is a weighing factor.

"Unavoidable impurities" refers to components present in a composition which do not affect the properties of the composition. Unavoidable impurities are present in a composition at: less than 5 weight %; or, less than 4 weight %; or, less than 3 weight %; or, less than 2 weight %; or, less than 1 weight %; or less than 0.5 weight %; or less than 0.1 weight %.

"Weight %" refers to the percentage weight in grams of a component of a composition in every 100 grams of a composition. For example, if a glass batch composition contains cullet at 10 weight %, then there is 10 g of cullet for every 100 g of the glass batch composition.

EXAMPLES

The following are non-limiting examples that discuss, with reference to tables and figures, the advantages of using organically contaminated cullet according to the present disclosure. Prior to the present disclosure such organically contaminated cullet was sent to landfill because organic contamination was seen as an unacceptable waste component.

Formation of Green Glass

The following non-limiting examples discuss the preparation and use of glass batches according to the presently claimed invention.

A glass batch (GB1) was made from quartz sand (58 wt %), soda ash (18 wt %), limestone (13 wt %), dolomite (5.6 wt %), nepheline syenite (4.8 wt %), sodium sulfate (0.2 wt %), iron oxide (0.2 wt %), iron chromite (0.2 wt %). To this mixture (GB1) varying additions of cullet fines were made. Table 1 shows the varying amounts and types of cullet fines. Each column of Table 1 shows the following:

The "Type" column shows the internal nomenclature used to refer to each type of cullet fines used.

Figure 2:
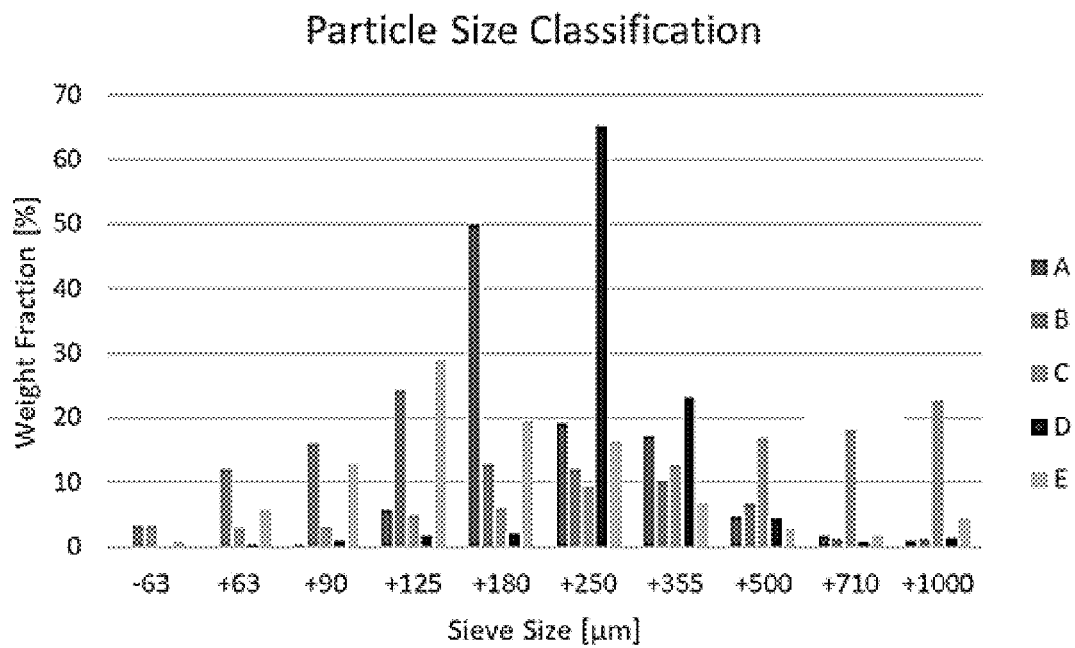
FIG. 2 shows the weight fraction of cullet particles of different sizes in certain example cullet fines.

The "Amount of cullet fines" column shows the amount of the type of cullet fines included in the glass batch (i.e. added to GB1). FIG. 2 shows the distributions of the maximum dimensions in the tested cullets. FIG. 2 shows the weight fraction of the cullet maximum dimensions (y axis) resting on particular sieve sizes (the x axis), for each type of cullet fine (i.e. designated A, B, C and D in Table 1).

The "GB1" column shows the amount of GB1 included in the particular example glass batch.

The "Batch redox number" column shows the batch redox number for each glass batch.

The "Cullet fines LOI" column shows the measured value of LOI for the cullet fines of the particular types.

The "Cullet fines COD" column shows the measured value of COD for the cullet fines of the particular types.

The "Cullet fines carbon content" column shows the measured value of carbon content for the cullet fines of the particular types.

The "Characteristics of resulting glass (iron redox)" column shows the iron redox of the resulting glass, as determined with UV-Vis spectroscopy.

TABLE 1

| Type | Amount of cullet fines/ weight % | GB1 (identical proportions)/ weight % | Batch redox number | Cullet fines LOI/ weight % | Cullet fines COD/ mg O₂/L | Cullet fines carbon content/ weight % | Characteristics of resulting glass (iron redox) |
|---|---|---|---|---|---|---|---|
| A | 3.85% | 96.15% | −4.6 | 5.89 | 25500 | 3.36 | 0.2356 |
| A | 13.79% | 86.21% | −16.8 | 5.89 | 25500 | 3.36 | 0.6358 |
| B | 1.96% | 98.04% | −4.6 | 12.62 | 47000 | 7.57 | 0.2563 |
| B | 6.98% | 93.02% | −16.8 | 12.62 | 47000 | 7.57 | 0.6324 |
| C | 5.35% | 94.65% | −4.6 | 2.84 | 16000 | 1.55 | 0.3064 |
| C | 24.53% | 75.47% | −16.8 | 2.84 | 16000 | 1.55 | 0.6504 |
| D | 1.47% | 98.53% | −4.6 | 16.29 | 62000 | 9.89 | 0.2491 |
| D | 5.39% | 94.61% | −16.8 | 16.29 | 62000 | 9.89 | 0.5836 |

Acceptable levels for the iron redox values depend on the glass type that is to be made. The whole range from oxidised (batch redox number of zero and above) to reduced (negative batch redox number) can be chosen, depending on the type of glass produced. After this choice is made, typically a glass manufacturer will not change the desired batch redox number because this will affect the production method and the product quality. The fact that organic contamination of cullet affects the redox number of glass batches leads to the problem of uncontrolled variations in the iron redox of glass produced from glass batches containing organically contaminated cullet. The present inventors surprisingly discovered that with measurement and control over the characteristics of the organically contaminated cullet, the organically contaminated cullet can be used as an effective reductant without uncontrolled disturbances to the glass melting process.

Formation of Flint Glass

A glass batch (GB2) was made from quartz sand (61.2 wt %), soda ash (18.36 wt %), limestone (13.77 wt %), dolomite (6.12 wt %), and sodium sulfate (0.55 wt %). To this mixture (GB2) cullet fines were added. Table 2 shows the amount of cullet fines. Each column of Table 2 shows the following:

The "Type" column shows the internal nomenclature used to refer to the type of cullet fines used.

The "Amount of cullet fines" column shows the amount of the type of cullet fines included in the glass batch (i.e. added to GB2). FIG. 2 shows the distributions of the maximum dimensions in the tested cullets. FIG. 2 shows the weight fraction of the cullet maximum dimensions (y axis) falling through particular sieve sizes (the x axis), for each type of cullet fine (i.e. designated E in Table 2).

The "GB2" column shows the amount of GB2 included in the particular example glass batch.

The "Cullet fines LOI" column shows the measured value of LOI for the cullet fines of the particular types.

The "Cullet fines COD" column shows the measured value of COD for the cullet fines of the particular types.

The "Cullet fines carbon content" column shows the measured value of carbon content for the cullet fines of the particular types.

The "Characteristics of resulting glass (iron redox)" column shows the iron redox of the resulting glass, as determined with UV-Vis spectroscopy.

TABLE 2

| Type | Amount of cullet fines/ weight % | GB2 (identical proportions)/ weight % | Cullet fines LOI/ weight % | Cullet fines COD/ mg O₂/L | Cullet fines carbon content/ weight % | Characteristics of resulting glass (iron redox) |
|---|---|---|---|---|---|---|
| E | 3.85% | 96.15% | 5.64 | 25000 | 3.11 | Not measured |

The batch redox number for the batch shown in Table 2 was +5.4.

The methods of obtaining the information in Tables 1 and 2 are set out below.

Cullet Fines Characteristics

The carbon content of the cullet fines was measured by combustion analysis with a LECO™ CS230.

The loss-on-ignition of the cullet fines was determined from the decrease in mass after heat treatment. The cullet fines were first dried for 1 hour at 105° C. in a drying chamber (Memmert GmbH UFB500). An alumina crucible with the dried material was inserted in a laboratory furnace (Nabertherm GmbH) and subjected to a temperature of 550° C. for 3.5 hours or of 1100° C. for 1 hour. The decrease in mass of the material (i.e. the dried material), which had been subjected to the heat treatment, was measured and determined the loss-on-ignition.

The chemical oxygen demand (COD) of the cullet fines was measured by inserting 50 g of the cullet fines in a glass beaker with 2 L of water, preheated to 65° C. The temperature of the water was maintained at 65° C. with a recirculation bath. Every 30 minutes the mixture was agitated with a glass rod. After 60 minutes, the glass beaker was removed from the bath, covered with a lid and left to cool to room temperature. The contaminated water was then analysed according to the COD procedure (Hach LCK 514). The value is normalised to mg O₂/kg or equivalently mg O₂/L to enable a direct comparison with COD measurements on cullet, where conventionally 10 kg is inserted into 10 L of water.

The particle size distribution of the cullet fines was determined with a vibration sieve shaker using sieve sizes of 1000, 710, 500, 355, 250, 180, 125, 90 and 63 μm.

The composition ranges of the organically contaminated cullet used in these experiments was as shown in Table 3.

Table 3: Composition ranges cullet fines (glass fraction; excluding unavoidable impurities)

| Compound | Weight % |
|---|---|
| $Fe_2O_3$ | From 0.3 to 0.8 |
| $Al_2O_3$ | From 1.5 to 2.2 |

-continued

| Compound | Weight % |
|---|---|
| $K_2O$ | <1 |
| CaO | From 11 to 12 |
| MgO | From 1.3 to 1.6 |
| $Na_2O$ | From 12 to 13 |
| $SiO_2$ | From 70.31 to 73.84 |
| $Cr_2O_3$ | From 0.06 to 0.09 |

The ranges of organic contamination for the cullet samples tested (not all shown in Table 1) had the following characteristics:
LOI: 1.2-20 wt %
Carbon content: 0.45-11 wt %
COD: 16,000-75,000 mg $O_2$/L Resulting Glass Characteristics The glass batch mixture, in each case, was melted in a platinum crucible (XRF Scientific Ltd, 87Pt-10 Rh-3Au) in a laboratory furnace (Nabertherm GmbH LHT08/17) at 1450° C. for 2 hours. The glass melt was quenched, ground, mixed and remelted at 1450° C. for 2 hours. The molten glass was then poured from the crucible onto a heating plate (LHG) and the resulting glass bead is transferred to an annealing furnace (Nabertherm GmbH N7/H) at 580° C. for annealing for two hours and slow cooling to room temperature, over at least six hours.

The annealed glass bead was ground in a grinder (Struers Inc. Tegramin 25) with resin-bonded diamond-surface plates (Struers Inc. MD-Piano) to approximately 4 mm (as maximum dimension) and then polished with a woven-acetate polishing cloth (Struers Inc. MD-Dac). The light transmission of the polished glass bead was measured with a spectrophotometer (PerkinElmer™ Lambda 950) in the wavelength range of from 250 to 1100 nm.

Remnant glass from the melting procedure was ground with a ball mill and used for composition analysis. The glass powder was mixed with lithium tetraborate and converted to a glass disc by fusion (XRF Scientific XRFuse 6). This glass disc was used to measure the glass composition with an X-ray fluorescence spectrometer (Malvern PANalytical B.V. $\text{Axios}^{mAx}$).

The iron redox value of the glass was calculated from the total iron oxide concentration measured with XRF and the light transmission of the glass bead, according to the following formula:

$$\frac{Fe^{2+}}{Fe_{tot}} = -\frac{\log(T/0.92)}{dc\alpha}$$

The light transmission of the glass bead was measured in each instance using a PerkinElmer™ Lamda 950 spectrophotometer.

In this formula, T is the light transmission at 1050 nm (%), d is the thickness of the glass bead (cm), c is the total iron oxide concentration (wt %) and a is the linear extinction coefficient for ferrous iron with a value of 9.1.

Effect of Organic Contamination on Iron Redox in Resulting Glass

FIG. 1 shows that as the organic contamination increases (i.e. LOI-equivalent added) the iron redox figure increases. Therefore, adding relatively more organically contaminated cullet fines to a glass batch provides control over the glass batch reaction (the organically contaminated cullet acts as a reductant). High levels of organically contaminated cullet leads to more reduced glass (which is likely not the aim in most desired glass products). At extremely high levels of organically contaminated cullet (for example greater than 50 weight % in a glass batch), actual metal, e.g. metallic iron, can form during a glass batch melt method.

The present inventors surprisingly discovered that the use of cullet fines in glass batch compositions provide beneficial glass compositions. Prior to the present disclosure, such cullet fines were generally sent to landfill. The present inventors also discovered that by varying the organic contamination in cullet fines it is possible to control the iron redox of the produced glass.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the claimed invention in diverse forms thereof.

We claim:

1. A soda lime glass batch composition, comprising:
   from 1 weight % to 50 weight % a first plurality of glass cullet particles, wherein the first plurality of glass cullet particles have a maximum dimension of 5 mm or less and the glass cullet particles are organically contaminated;
   from 50 weight % to 99 weight % other components of the glass batch, wherein the other components of the glass batch comprise silica sand, soda ash, and limestone; and
   unavoidable impurities, wherein the unavoidable impurities are distinct from any organic contaminants present in the glass cullet particles;
   wherein the organic contamination of the first plurality of glass cullet particles:
   a. measured by loss on ignition ("LOI") is from 0.5 weight % to 20 weight % of the first plurality of glass cullet particles;
   b. measured by chemical oxygen demand ("COD") is from 4,000 mg $O_2$/L to 75,000 mg $O_2$/L; and,
   c. measured by combustion analysis provides a carbon content of from 0.30 weight % to 15 weight %.

2. The glass batch composition according to claim 1, wherein the organic contamination of the first plurality of glass cullet particles measured by loss on ignition ("LOI") is: from 1.2 weight % to 20 weight % of the first plurality of glass cullet particles; or, from 2.5 weight % to 17.0 weight % of the first plurality of glass cullet particles.

3. The glass batch composition according to claim 1, wherein the organic contamination of the first plurality of glass cullet particles measured by chemical oxygen demand ("COD") is: from 16,000 mg $O_2$/L to 75,000 mg $O_2$/L; or, from 15,000 mg $O_2$/L to 63,000 mg $O_2$/L.

4. The glass batch composition according to claim 1, wherein the organic contamination of the first plurality of glass cullet particles measured by combustion analysis provides: a carbon content of from 0.45 weight % to 11 weight %; or, a carbon content of from 1.5 weight % to 10 weight %.

5. The glass batch composition according to claim 1, wherein the first plurality of glass cullet particles:
have a maximum dimension of 2 mm or less; or,
have a maximum dimension of from 5 µm to 500 µm.

6. The glass batch composition according to claim 1, wherein the glass batch composition comprises from 1 weight % to 50 weight % a first plurality of glass cullet particles, wherein the glass cullet particles have a maximum dimension of 2 mm or less and the glass cullet particles are organically contaminated.

7. The glass batch composition according to claim 1, wherein the glass batch composition further comprises dolomite, sodium sulfate, or both dolomite and sodium sulfate.

8. The glass batch composition of according to claim 1, wherein the:
from 1 weight % to 50 weight % a first plurality of glass cullet particles component of the glass batch composition provides a contributing redox factor of from 0 to −1.5 to the glass batch composition; and/or,
wherein the glass batch composition has a batch redox number of: from −40 to +20.

9. A method of forming glass, the method comprising:
introducing the glass batch composition according to claim 1 into a glass furnace;
heating the glass batch composition to produce a glass solution; and
cooling the glass solution to make a glass.

10. The glass batch composition according to claim 1, wherein the glass batch composition comprises from 1 weight % to 25 weight % a first plurality of glass cullet particles, wherein the glass cullet particles have a maximum dimension of 2 mm or less and the glass cullet particles are organically contaminated.

11. The glass batch composition according to claim 1, wherein the other components comprise a second plurality of glass cullet particles (optionally having a maximum dimension of greater than 5 mm), wherein the second plurality of glass cullet particles all have a maximum dimension greater than the first plurality of glass cullet particles.

12. The glass batch composition according to claim 11, wherein the first plurality of glass cullet particles, and optionally the second plurality of glass cullet particles, are organically contaminated with:
one or more of: cellulose, lignin, proteins, lipids, carbohydrates, polymers and/or plastics; and/or,
one or more of: paper, glue, sugar, oil, fat, wood and/or cork.

13. The glass batch composition according to claim 11, wherein the first plurality of cullet particles, and/or the second plurality of cullet particles, absent organic contamination (the glass fraction) have a chemical composition comprising:
$Fe_2O_3$ in an amount ranging from 0.3 to 0.8 weight %;
$Al_2O_3$ in an amount ranging from 1.5 to 2.2 weight %;
$K_2O$ in an amount less than 1 weight %;
CaO in an amount ranging from 11 to 12 weight %;
MgO in an amount ranging from 1.3 to 1.6 weight %;
$Na_2O$ in an amount ranging from 12 to 13 weight %;
$SiO_2$ in an amount ranging from 70.31 to 73.84 weight %; and
$Cr_2O_3$ in an amount ranging from 0.06 to 0.09 weight %.

14. The glass batch composition according to claim 11, wherein: the glass batch composition is a loose glass batch composition; and/or,
the first plurality of glass cullet particles is free of metals and/or ceramics.

15. The glass batch composition according to claim 14 wherein the loose glass batch composition is not agglomerated in pellet or briquette form.

16. The glass batch composition according to claim 14 wherein the second plurality of glass cullet particles is free of metals and/or ceramics.

* * * * *